US007584634B2

(12) United States Patent
Hoffman

(10) Patent No.: US 7,584,634 B2
(45) Date of Patent: Sep. 8, 2009

(54) PIVOTABLE-LEVER LOCK

(75) Inventor: Rainer Hoffman, Langenfeld (DE)

(73) Assignee: EMKA Beschlagteile GmbH & Co. (DE)

( * ) Notice: Subject to any disclaimer, the term of this patent is extended or adjusted under 35 U.S.C. 154(b) by 43 days.

(21) Appl. No.: 11/855,074

(22) Filed: Sep. 13, 2007

(65) Prior Publication Data

US 2008/0060392 A1 Mar. 13, 2008

(30) Foreign Application Priority Data

Sep. 13, 2006 (DE) .................. 20 2006 014 041 U

(51) Int. Cl.
*B60R 25/02* (2006.01)

(52) U.S. Cl. ......................... 70/208; 70/224; 292/336.3

(58) Field of Classification Search ........... 70/208–210, 70/215, 224, DIG. 31; 292/39, 336.3
See application file for complete search history.

(56) References Cited

U.S. PATENT DOCUMENTS 2,427,386 A * 9/1947 Claud-Mantle ........ 292/169.11
3,745,796 A * 7/1973 Fleming ........................ 70/81
4,510,779 A * 4/1985 Ahad .......................... 70/208
4,554,807 A * 11/1985 Dolejs ......................... 70/208
4,631,937 A * 12/1986 Debus et al. .................. 70/207
4,930,325 A * 6/1990 Ramsauer .................... 70/209
4,998,757 A 3/1991 Ramsauer
5,457,971 A * 10/1995 Yamada ....................... 70/208
5,556,145 A * 9/1996 Takasaki .................. 292/336.3
5,685,181 A * 11/1997 Ramsauer .................... 70/208
5,722,269 A * 3/1998 Simon et al. .................. 70/208
5,862,690 A * 1/1999 Jancsek ....................... 70/224
5,873,274 A * 2/1999 Sauerland .................... 70/208
5,970,757 A * 10/1999 Ramsauer .................... 70/208
6,039,363 A * 3/2000 Sugimura et al. ........... 292/202
6,182,483 B1 * 2/2001 von Kathen et al. ........... 70/208
6,263,712 B1 * 7/2001 Ramsauer .................... 70/208
6,293,130 B1 * 9/2001 Ramsauer ........................ 70/2
6,298,697 B1 * 10/2001 Ramsauer .................... 70/208
6,341,512 B1 * 1/2002 Ramsauer .................... 70/208
6,363,761 B1 * 4/2002 Sauerland .................... 70/208
6,427,501 B2 * 8/2002 Ramsauer .................... 70/208
6,519,984 B1 * 2/2003 Morris ........................ 70/210

(Continued)

FOREIGN PATENT DOCUMENTS

DE 297 05 508 7/1997

*Primary Examiner*—Suzanne D Barrett
(74) *Attorney, Agent, or Firm*—Robert W. Becker; Robert W. Becker & Assoc.

(57) ABSTRACT

A retractable lock for cabinet doors, wherein a cradle in a cutout door portion accommodates a lever handle secured, in a pivoted-in position, by a locking mechanism. The lever handle pivots out of the cradle over an operating displacement, via a pivot bearing, in a plane perpendicular to the door panel. A latching bar on the opposite side of the cradle is longitudinally displaceable, with the operating displacement of the lever handle being converted into longitudinal displacement of the latching bar. In a pivoted-in position of the lever handle, an extension thereof rests against a side of an arm fixedly connected to, and extending from, the latching bar facing the direction of movement of the latching bar into its locking position. A spring disposed between the arm and an abutment of the cradle biases the latching bar into its extended locking position.

8 Claims, 2 Drawing Sheets

U.S. PATENT DOCUMENTS

| | | | | |
|---|---|---|---|---|
| 6,550,296 | B2 * | 4/2003 | Segawa | 70/208 |
| 6,851,289 | B2 * | 2/2005 | Ramsauer | 70/208 |
| 7,152,893 | B2 * | 12/2006 | Pudney | 292/336.3 |
| 7,159,909 | B1 * | 1/2007 | Hung | 292/336.3 |

* cited by examiner

PIVOTABLE-LEVER LOCK

The instant application should be granted the priority date of 13 Sep. 2006 the filing date of the corresponding German patent application DE 20 2006 014 041.7.

BACKGROUND OF THE INVENTION

The present invention relates to a collapsible or retractable lock for doors of in particular thin-walled cabinets, and includes a cradle that can be inserted into a cutout portion of the door, and that is configured on its front side for accommodating a lever handle in a retractable manner, whereby in the pivoted-in position in the cradle, the lever handle can be secured in place via a locking mechanism, and in the plane perpendicular to the door panel, the lever handle can be pivoted out of the cradle via a pivot bearing over an operating stroke or displacement, whereby the operating displacement of the lever handle is converted into a longitudinal displacement of at least one latching bar that is longitudinally displaceably guided on the other side of the cabinet between a locking position and an opening position.

A lock of the aforementioned type is described in DE 297 05 508 U1. With the known lock, the pivoting out of the lever handle out of the cradle is converted directly into a longitudinal displacement of a latching bar in that the lever handle, during its pivoting movement, drives a pinion disposed parallel to its plane of movement, wherein at a front side the teeth of the pinion engage the recesses of the displaceable latching bar. The known lock has the drawback that after passing through the operating stroke, for the opening of the lock the lever handle must remain in the pivoted-out open position with the lock open, which can have a disruptive effect during operation. To this extent there is the further drawback that with the lever handle pivoted in, a subsequent closing of the door is not possible due to the direct coupling of the latching bar, pinion, and lever handle. Finally, the lock is also not suitable for the provision of a second latching bar for a two-point locking, and also not for the provision of an additional tongue, which extends behind a part of the cabinet for a three-point locking, with such two- or three-point locks being know, for example, from EP 0 261 267 B1.

It is therefore an object of the present invention to variably configure a retractable lock of the aforementioned general type in such a way that a one-point, two-point, or three-point lock is selectively possible, with the operating displacement of the lever handle remaining the same.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

Figures 1, 1A:
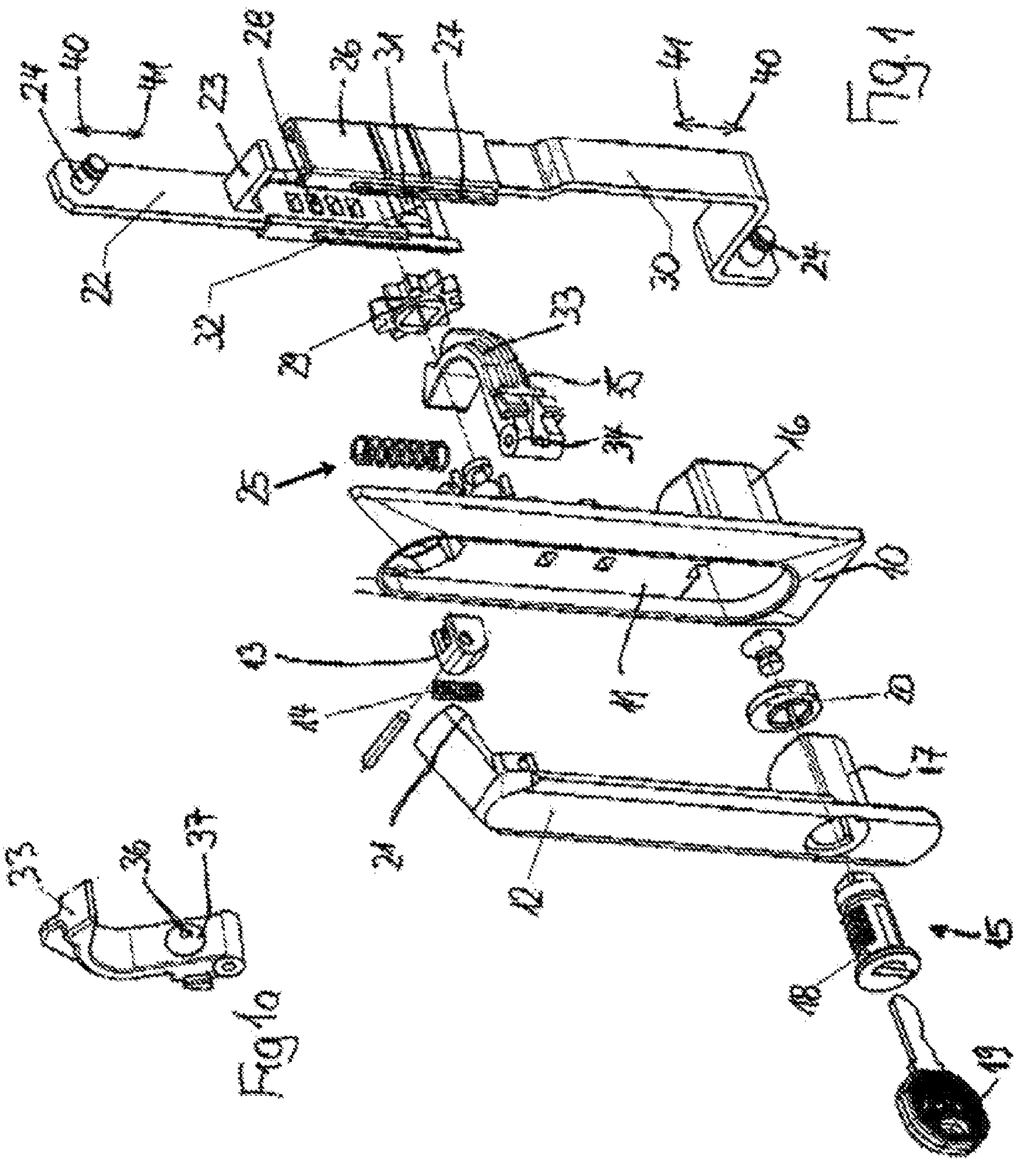
FIG. 1 is a perspective, exploded view of the individual components of a collapsible or retractable lock.
FIG. 1*a* is a detailed illustration of the latching hook of the lock of FIG. 1.
Figure 2:
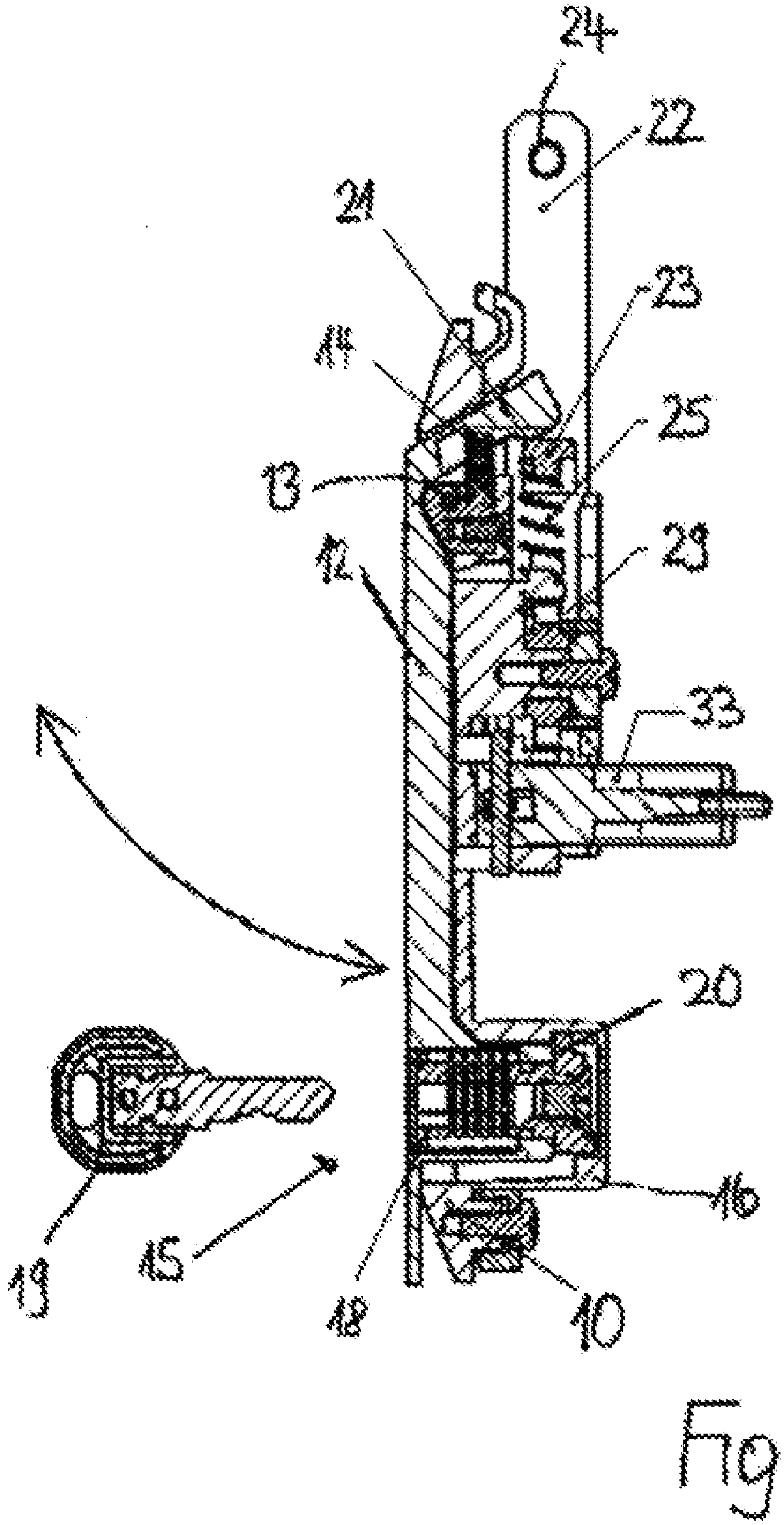
FIG. 2 is a cross-sectional side view of the lock of FIG. 1 in the assembled state.

Pursuant to the retractable lock of the present application, the lever handle, in the pivoted-in position, by means of an extension that projects from the lever handle in the direction toward the latching bar, rests upon that side of an arm that is fixedly connected to, and extends from, the latching bar that faces the direction of movement of the latching bar into its locking position, wherein a spring is disposed between the arm of the latching bar and an abutment formed on the inner side of the cradle, with the spring biasing the latching bar into its extended locking position. The present invention thus rests upon the principle that a connection between the lever handle and the latching bar, which in the state of the art is still made as a positive, interlocking connection, is released, so that although a pivoting-out of the lever handle displaces the latching bar directly from the locking position into its release position, none the less even when the lever handle is pivoted in, a relative movement of the latching bar from its locking position into the open position is possible. Consequently, in an advantageous manner on the one hand after the opening of the lock the lever handle can again return to its pivoted-in position without obstructing the locking movement of the latching bar, and on the other hand a door equipped with the inventive lock can be slammed into its closed position even if the lever handle is pivoted in and is locked by the locking mechanism. Since pursuant to the present application the latching bar is spring-biased in its extended locking position, and hence rests against the extension of the lever handle via its arm, every pivoting movement of the lever handle out of the cradle leads directly to the displacement of the latching bar from the locking position into the opening or release position.

To the extent that with the arrangement of a single latching bar as with the aforementioned general type of lock in principle a cabinet door can already be closed, pursuant to a specific embodiment of the present application a latching hook is mounted on the inside of the cradle so as to be pivotable in a plane perpendicular to the plane of movement of the latching bar between a locking position, formed by extending behind a part of the cabinet, and a release position, wherein on its side facing the latching bar, the latching hook is provided with a cam having inclined surfaces, and wherein a projection, which is disposed on the latching bar and is provided with corresponding inclined surfaces, is associated with the cam in such a way that a displacement of the latching bar from the locking position into the opening or release position brings about a pivoting of the latching hook into its release position. To the extent that the appropriately provided latching hook is relied upon in the sense of a one-point locking for the exclusive locking of the door upon closing of the cabinet, the latching bar merely fulfills an actuating function with the latching hook. However, together with the latching hook it also enables a multiple locking of the door.

In this connection, pursuant to one embodiment of the invention, the latching hook can be spring biased in its latching position.

Pursuant to a further embodiment of the invention, in a parallel arrangement to the latching bar that is acted upon by the lever handle, a second locking bar is displaceably mounted, whereby each of the bars has a series of holes and are coupled to one another by means of a pinion that is rotatably mounted on the cradle and engages into the holes. Accordingly, via the driving of the latching bar, at the same time a further locking bar can also be driven in the opposite direction of movement, thus realizing a two-point locking with two bars as described in EP 0 261 267 B1. In this connection, the additional latching hook can be eliminated, or it can also be associated with both bars in the sense of a three-point locking. Thus, the present invention provides a large variety of selections for designing the locking system for the door.

Pursuant to one embodiment of the invention, the bars are respectively guided in a U-shaped bar guide that spans the bars and that can be positively secured to the inner side of the cradle.

If the lever handle is biased into its pivoted-in position by means of a spring, the spring that biases the latching rod, and hence also the lever handle that rests thereon, into their locking positions, is relieved of tension, since this spring no longer has to take care of the pivoting-in movement of the lever handle.

Further specific features of the present invention will be described in detail subsequently.

DESCRIPTION OF SPECIFIC EMBODIMENTS

Referring now to the drawings in detail, the illustrated retractable lock is comprised of a cradle 10, which is to be inserted in a cutout portion of a non-illustrated door of a non-illustrated cabinet, and which is to be secured to the door panel. That side of the cradle 10 that is disposed on the outside of the door panel is provided with an indentation 11 for accommodating a lever handle 12 that can be folded or pivoted into the indentation 11. By means of a pivot bearing 13, the lever handle 12 is mounted on the cradle 10 so that it can be folded or pivoted out, whereby a spring 14 is integrated into the pivot bearing 13 that biases the lever handle 12 into its position pivoted into the indentation 11 of the cradle 10.

At its free end, the lower end in FIG. 1, the lever handle 12 is provided with a locking mechanism 15 for securing the lever handle 12 in the indentation 11 in a locking manner. For this purpose, the lever handle 12 is provided at one end with a housing 17 in which is disposed a cylinder 18 that can be actuated by a key 19 and that controls the rotational movement of a tongue 20. The lever handle 12, together with its housing 17 and the tongue 20, can be pivoted into a housing 16 that projects from the rear side of the cradle 10 and can be secured or locked in position therein by rotating the tongue 20.

Displaceably disposed of the inner side of the non-illustrated door panel, which carries the cradle 10, is an arresting or latching bar 22 that is guided in a U-shaped bar guide 26 that, by means of a retaining strip 27, can be positively secured in place on that inner or rear surface of the cradle 10 that faces away from the indentation 11. The latching bar 22 has an arm 23 that projects from it, and is further provided at its upper end with a connecting or mounting structure 24 for the attachment of a separate rod for the locking of the cabinet; such a locking system is know in principle from EP 0 261 267 B1. By means of a spring 25 that is supported against an abutment formed on the inner side of the cradle 10, the latching bar 22 is biased into its locking position, which is indicated by the arrow 40.

The latching bar 22 is furthermore provided with a series of holes 28 into which engage the teeth of an externally toothed pinion 29 that is rotatably mounted on the inner side of the cradle 10. Disposed across from the latching bar 22 relative to the arrangement of the pinion 29 is a second locking bar 30, which is displaceably mounted in an associated bar guide 26, whereby the external toothing of the pinion 29 engages in a correspondingly configured series of holes of the locking bar 30 in such a way that a displacement of the latching bar 22 can be converted into a displacement of the locking bar 30 in a respectively opposite direction of movement. The locking bar 30 is also provided at its free end with a connecting or mounting structure 24, whereby the locking bar 30 is laterally bent or offset so that its mounting structure 24 is disposed in the same plane as is the mounting structure of the latching bar 22.

The locking system is completed by an arresting or latching hook 33 that is disposed between the latching bar 22 and the locking bar 30, and that is rotatable or pivotable in a direction of movement transverse to the direction of displacement of the bars 22, 30; by means of a pivot bearing 34, the latching hook 33 is rotatably mounted on the cradle 10. A fastening or U-spring 35 is provided that biases the latching hook 33 into its locking position in which the latching hook, in a manner known per se, extends behind a part of the cabinet, preferably a frame part of the cabinet that carries the door, in a locking manner.

As can be seen in FIG. 1*a*, the latching hook 33 is provided on its inner side, which faces the latching bar 22, with a cam 36 having inclined run-up or approach surfaces 37. A projection 31 having a bevel or inclined surface 32 formed thereon is provided on the latching bar 22 and is associated with the cam 36 of the latching hook 33 in such a way that in the locking position of the latching bar 22, the bevel 32 of the projection 31, and the inclined surface 37 of the cam 36, rest against one another, so that a displacement of the latching bar 22 in its release position (arrow 41) brings about a pivoting of the latching hook 33 against the effect of the U-spring 35 in the release position thereof.

For the actuation of the locking system, that end of the lever handle 12 that is mounted in the pivot bearing 13 is provided with an extension 21 that extends through the cradle 10 and that, in the pivoted-in position of the lever handle 12 in the indentation 11 of the cradle 10, rests upon the arm 23 of the latching bar 22, and in particular on that side that faces the direction of movement of the latching bar 22 into the locking position (arrow 40). The extension 21 is disposed in such a way that in the pivoted-in position of the lever handle 12, the spring 25 that biases the latching bar 22 holds the arm 23 of the latching bar 22 respectively in abutment against the extension 21.

To open the lock after actuation of the locking mechanism 15 the lever handle 12 is pivoted out of the indentation 11 of the cradle 10. In this connection, the extension 21 of the lever handle 12 presses against the arm 23 of the latching bar 22 and displaces the latter in its release position in the direction of the arrow 41. This movement of the latching bar 22 is simultaneously converted via the pinion 29 into a corresponding displacement of the locking bar 30, so that the locking bar 30 is also moved into its release position (arrow 41). The bevel 32 of the projection 31 provided on the latching bar 22 also simultaneously presses against the inclined surface 37 of the cam 36 of the latching hook 33, so that by means of the linear displacement of the latching bar 22, the latching hook 33 is pivoted into its release position. After the open position is achieved, the lever handle 12 can be released, whereby the lever handle 12 is pivoted back, in particular by the action of the spring 14, into its pivoted-in position in the indentation 11 of the cradle 10. This movement is supported by the effect of the spring 25, which acts upon the arm 23 of the latching bar 22 and guides the two bars 22 and 30 back into their locking position (arrow 40). The U-spring 35 also simultaneously presses the latching hook 33 back into its locking position. Also in this position the door, which is equipped with the pivotable lock, can now be locked or shut, since the bars can move into their release position independently of the position of the lever handle, and the latching hook 33 is also uncoupled from the bar movement and can thus be moved back and forth independently during the closing of the door.

The features of the subject matter of these documents disclosed in the specification, the claims and the drawings can be important individually as well as in any desired combination with one another for realizing the various embodiments of the invention.

The specification incorporates by reference the disclosure of German priority document DE 20 2006 014 041.7 filed 13 Sep. 2006.

The present invention is, of course, in no way restricted to the specific disclosure of the specification and drawings, but also encompasses any modifications within the scope of the appended claims.

What I claim is:

1. A retractable lock for doors of cabinets, comprising:

a lever handle having an extension;

a cradle adapted to be inserted into a cutout portion of the door, wherein said cradle, on a first side adapted to face away from the door, is provided with means for accommodating said lever handle;

a locking mechanism for securing said lever handle in place when said lever handle is in a pivoted-in position in said cradle;

a pivot bearing, wherein said lever handle is adapted to be pivoted out of said cradle over an operating displacement, via said pivot bearing, in a plane that extends perpendicular to a panel of the door;

a latching bar disposed on a second side of said cradle opposite said means thereof accommodating said lever handle, wherein said latching bar is longitudinally displaceable between an extended locking position and a release position;

a means for converting the operating displacement of said lever handle into a longitudinal displacement of said latching bar;

an arm that is fixedly connected to, and extends from, said latching bar, wherein in a pivoted-in position of said lever handle, said extension, which projects from said lever handle in a direction toward said latching bar, is adapted to rest against a side of said arm that faces a direction of movement of said latching bar into its locking position; and a spring disposed between said arm of said latching bar and an abutment on said second side of said cradle, wherein said spring is adapted to bias said latching bar into its extended locking position, wherein a latching hook is mounted on said second side of said cradle so as to be pivotable in a plane perpendicular to a plane of movement of said latching bar between a latching position, formed by extending behind a part of the cabinet, and a release position, wherein on a side facing said latching bar, said latching hook is provided with a cam having inclined surfaces, and wherein a projection, which is disposed on said latching bar and is provided with corresponding inclined surfaces, is associated with said cam in such a way that a displacement of said latching bar from said locking position into said release position brings about a pivoting of said latching hook into its release position.

2. A retractable lock according to claim 1, wherein a further spring is provided for biasing said lever handle into its pivoted-in position.

3. A retractable lock according to claim 1, wherein said latching hook is spring-biased into its latching position.

4. A retractable lock for doors of cabinets, comprising:

a lever handle having an extension;

a cradle adapted to be inserted into a cutout portion of the door, wherein said cradle, on a first side adapted to face away from the door, is provided with means for accommodating said lever handle;

a locking mechanism for securing said lever handle in place when said lever handle is in a pivoted-in position in said cradle;

a pivot bearing, wherein said lever handle is adapted to be pivoted out of said cradle over an operating displacement, via said pivot bearing, in a plane that extends perpendicular to a panel of the door;

a latching bar disposed on a second side of said cradle opposite said means thereof accommodating said lever handle, wherein said latching bar is longitudinally displaceable between an extended locking position and a release position;

a means for converting the operating displacement of said lever handle into a longitudinal displacement of said latching bar;

an arm that is fixedly connected to, and extends from, said latching bar, wherein in a pivoted-in position of said lever handle, said extension, which projects from said lever handle in a direction toward said latching bar, is adapted to rest against a side of said arm that faces a direction of movement of said latching bar into its locking position; and a spring disposed between said arm of said latching bar and an abutment on said second side of said cradle, wherein said spring is adapted to bias said latching bar into its extended locking position wherein in a parallel arrangement to said latching bar that is acted upon by said lever handle, a second locking bar is displaceably mounted, further wherein both said latching bar and said locking bar are respectively provided with a series of holes, and wherein said latching bar and said locking bar are coupled to one another by means of a pinion that is rotatably mounted on said cradle and engages into said holes.

5. A retractable lock according to claim 4, wherein a latching hook is mounted on said second side of said cradle so as to be pivotable in a plane perpendicular to a plane of movement of said latching bar between a latching position, formed by extending behind a part of the cabinet, and a release position, wherein on a side facing said latching bar, said latching hook is provided with a cam having inclined surfaces, and wherein a projection, which is disposed on said latching bar and is provided with corresponding inclined surfaces, is associated with said cam in such a way that a displacement of said latching bar from said locking position into said release position brings about a pivoting of said latching hook into its release position.

6. A retractable lock according to claim 5, wherein said latching hook is spring-biased into its latching position.

7. A retractable lock according to claim 4, wherein each of said latching bar and said locking bar is respectively guided in a U-shaped bar guide that is adapted to be positively secured to said second side of said cradle and extends about said latching bar and said locking bar.

8. A retractable lock according to claim 4, wherein a further spring is provided for biasing said lever handle into its pivoted-in position.

* * * * *